(12) United States Patent
Ruiz

(10) Patent No.: US 7,523,738 B2
(45) Date of Patent: Apr. 28, 2009

(54) IDLE QUALITY BY TORQUE SMOOTHING

(75) Inventor: Victoriano Ruiz, Roscommon, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 12/107,269

(22) Filed: Apr. 22, 2008

(65) Prior Publication Data

US 2008/0314361 A1   Dec. 25, 2008

Related U.S. Application Data

(60) Provisional application No. 60/936,978, filed on Jun. 22, 2007.

(51) Int. Cl.
*F02P 5/15* (2006.01)
(52) U.S. Cl. .............. 123/339.11; 123/406.2; 123/406.23; 123/406.24
(58) Field of Classification Search ............ 123/339.11, 123/406.2, 406.23, 406.24
See application file for complete search history.

(56) References Cited

U.S. PATENT DOCUMENTS

| | | | | |
|---|---|---|---|---|
| 5,111,405 A * | 5/1992 | Maeda et al. | ............... | 701/110 |
| 5,495,835 A * | 3/1996 | Ueda | ..................... | 123/339.11 |
| 5,727,522 A * | 3/1998 | Otani et al. | ............ | 123/339.11 |
| 6,513,489 B2 * | 2/2003 | Osanai | ................... | 123/339.11 |
| 6,834,638 B2 * | 12/2004 | Lee | ........................ | 123/339.11 |
| 7,021,281 B2 * | 4/2006 | Ruiz | ..................... | 123/339.19 |
| 7,040,284 B2 * | 5/2006 | Demura et al. | ........ | 123/339.11 |
| 7,347,184 B2 * | 3/2008 | Kuroda et al. | ............... | 123/434 |
| 7,418,943 B2 * | 9/2008 | Reynolds et al. | ....... | 123/339.11 |

* cited by examiner

*Primary Examiner*—Erick Solis

(57) ABSTRACT

An idle speed control system for an engine includes an engine speed module that generates an engine speed signal. A piston reciprocation module determines reciprocation periods of each piston of cylinders of the engine based on the engine speed signal. A difference module determines a period difference between each of the reciprocation periods and an idle period associated with a target idle speed. A spark timing module regulates an idle speed of the engine including adjustment of spark timing for each of the cylinders individually based on period differences.

20 Claims, 3 Drawing Sheets

IDLE QUALITY BY TORQUE SMOOTHING

CROSS-REFERENCE TO RELATED APPLICATIONS

This application claims the benefit of U.S. Provisional Application No. 60/936,978, filed on Jun. 22, 2007. The disclosure of the above application is incorporated herein by reference.

FIELD

The present disclosure relates to engine control, and more particularly to torque output during engine idle periods.

BACKGROUND

The statements in this section merely provide background information related to the present disclosure and may not constitute prior art.

An internal combustion engine of a vehicle generates drive torque through the combustion of an air/fuel mixture. More specifically, air is drawn into the engine and is mixed with fuel. The air/fuel mixture is compressed within a cylinder of the engine and is ignited. Combustion of the compressed air/fuel mixture reciprocally drives a piston within the cylinder. The piston, in turn, rotatably drives a crankshaft, which outputs drive torque to a driveline.

In some instances, such as when the vehicle is stopped, the engine idles at or near an idle speed. Fluctuations in the idle speed can cause vibrations. The fluctuations are caused by torque output differences between each of the cylinders of the engine. The differences in torque output may be related to a number of factors, such as an effective compression ratio, an air/fuel ratio, etc. The torque output differences between the cylinders tend to accentuate with increased age of the engine.

One method of controlling engine idle speed of the engine includes adjusting air and/or fuel flow to maintain a selected idle speed. This has limited control over maintaining an idle speed and in preventing fluctuations in torque output.

SUMMARY

In one embodiment, an idle speed control system for an engine is provided and includes an engine speed module that generates an engine speed signal. A piston reciprocation module determines reciprocation periods of each piston of cylinders of the engine based on the engine speed signal. A difference module determines a period difference between each of the reciprocation periods and an idle period associated with a target idle speed. A spark timing module regulates an idle speed of the engine including adjustment of spark timing for each of the cylinders individually based on period differences.

In other features, a method of regulating an idle speed of an engine includes generating an engine speed signal. Reciprocation periods are determined for each piston of cylinders of the engine based on the engine speed signal. A period difference between each of said reciprocation periods and an idle period associated with a target idle speed is determined. The idle speed is regulated, which includes adjusting spark timing for each of the cylinders individually based on the period differences.

In yet other features, a method of generating a common torque from each cylinder of an engine includes generating an engine speed signal. Reciprocation periods are determined for each piston of cylinders of the engine based on the engine speed signal. A period difference between each of the reciprocation periods and an idle period associated with a target idle speed is determined. The torque outputs of each of the cylinders are matched relative to each other based on the period differences while the engine is operating at an idle speed.

In another feature, the regulating includes incrementally adjusting the spark timing.

In another feature, the regulating includes one of advancing and retarding the spark timing.

In another feature, the method further includes regulating the spark timing, determining whether the engine is operating at steady-state and further regulating the spark timing when the engine is operating at steady-state.

In still another feature, the regulating occurs when the engine is operating at idle.

In yet another feature, spark timing adjustment values are generated. The spark timing adjustment values are stored. Ignition of the engine is induced based on the spark timing adjustment values upon the engine operating at an idle speed.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
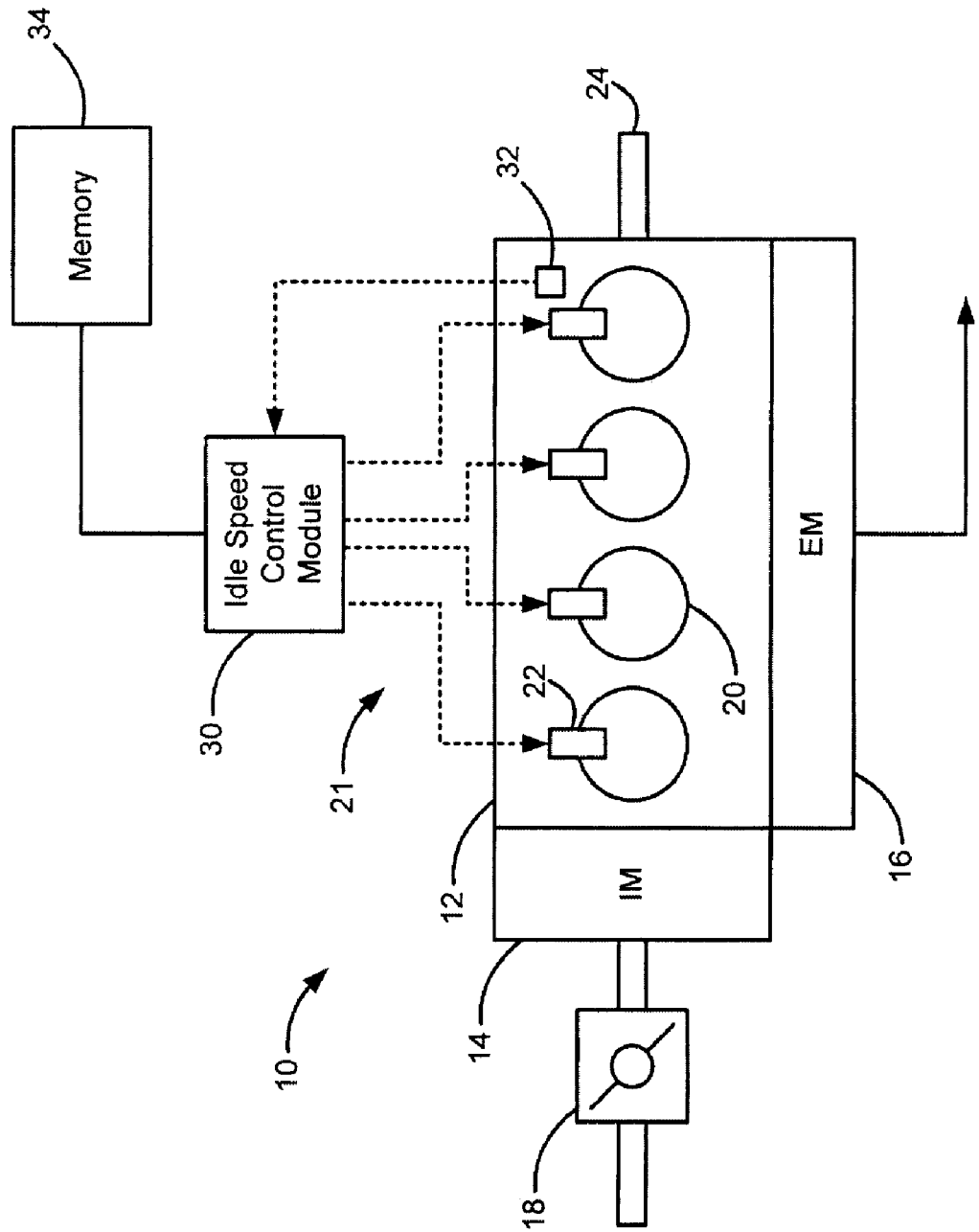
FIG. 1 is a functional block diagram of an exemplary idle speed control system in accordance with an embodiment of the present disclosure.

One method of controlling an idle speed of an engine includes the adjustment of air flow and the adjustment of spark timing of engine cylinders. Air flow to the engine is adjusted to adjust a current idle speed to match a selected idle speed. Fluctuations in the adjusted idle speed of the engine are corrected via adjustment in spark timing. The spark timing adjustment is performed dynamically. A maximum spark for best torque (MBT) value is reduced by retarding spark timing. The more the MBT value is reduced, the larger a range of authority that is available. This range is referred to as a torque reserve. Since a reduced torque output is provided, when an engine speed undershoot occurs, an increase in spark advance causes an increase in torque. An increase in torque, increases the speed of the engine thereby correcting the undershoot.

The stated idle speed control is provided via a closed loop that is based on the selected idle speed. When the control is active the same spark advance correction is applied to all the cylinders equally during each cycled event. This provides limited control over the torque output of each of the cylinders and thus limited ability to prevent idle fluctuations. The stated control affects the idle speed, but does not correct the difference in torque from the individual cylinders. The following disclosed embodiments provide improved control over output torque of each of the cylinders and the improved idle speed performance.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary engine idle control system 10 is shown. The engine idle control system 10 includes an engine 12, an intake manifold 14 and an exhaust manifold 16. Air is drawn into the intake manifold 14 through a throttle 18 and is distributed to cylinders 20. The air is mixed with fuel and the air/fuel mixture is compressed and ignited within the cylinders 20. This reciprocally drives pistons within the respective cylinders 20. The engine idle control system 10 further includes an ignition system 21 with spark plugs 22 that are associated with each of the cylinders 20 and induce combustion events therein. The reciprocally driven pistons rotatably drive a crankshaft 24. Exhaust gases are exhausted from the cylinders 20 through the exhaust manifold 16.

An idle speed control module 30 regulates operation of the engine system 10 based on the engine idle speed control of the present disclosure. An engine speed indication sensor 32 generates an engine speed indication signal. The engine speed sensor 32 may include a crankshaft position sensor and generate a crankshaft position signal based on the rotational position of the crankshaft 24. The engine speed sensor 32 may include a camshaft sensor, a transmission sensor, etc. Furthermore, the control module 30 determines the engine speed, as well as the position of each of the pistons within each of the cylinders based on the engine speed indication signal.

The engine 12 operates using a four stroke combustion cycle. During an intake stroke, a piston of the engine 12 moves downward from a top dead center (TDC) position within a corresponding cylinder to a bottom dead center (BDC) position while drawing in the air/fuel mixture (i.e., intake stroke). Having reached the BDC position, the piston moves upward within the cylinder to compress the air/fuel mixture (i.e., compression stroke). When the piston is at or near the TDC position, an associated spark plug ignites the air/fuel mixture. Combustion of the air/fuel mixture pushes the piston back towards the BDC position (i.e., power stroke) to drive the crankshaft 24. After the combustion event, the piston again moves upward toward the TDC position, pushing out exhaust gases into the exhaust manifold (i.e., exhaust stroke).

Spark timing refers to the point in time at which a spark plug ignites an air/fuel mixture and is based on the position of a piston within a cylinder. The position of the piston may be provided in terms of the rotational position of the crankshaft. For example, the spark timing of a particular cylinder may be provided as X° before TDC. Thus, the ignition occurs when the crankshaft is at X° before the piston achieves TDC within the cylinder. The spark timing for each cylinder may be retarded or advanced with respect to each current spark timing position.

The engine idle control described with respect to the embodiments disclosed herein regulate the torque output of each cylinder by adjusting the spark timing of each cylinder on an individual basis. The engine idle control applies spark timing correction for each cylinder. More specifically, the engine idle speed control monitors the reciprocation period ($t_{RECi}$) of each piston per combustion cycle as an indication of torque, where i is the piston/cylinder number. The piston/cylinder number i may increment according to firing order of the spark plugs 22. The reciprocation period $t_{RECi}$ is determined in accordance with the following relationship:

$$t_{RECi} = 1/RPM_i$$

wherein $RPM_i$ is the engine speed during the combustion cycle of cylinder i. The shorter the reciprocation period $t_{RECi}$, the larger the torque output of a cylinder.

The control module 30 determines period differences $\Delta t_i$ based on the following relationship:

$$\Delta t_i = t_{RECi} - t_{IDLE}$$

where $t_{IDLE}$ is the period associated with a target engine idle speed $RPM_{IDLE}$. The engine idle control compares the period differences $\Delta t_i$ for each of the cylinders in association with a current engine speed and calculates an average reciprocation period $\Delta t_{AVG}$. In one embodiment, the average reciprocation period $\Delta t_{AVG}$ is associated with a combustion cycle of each of the cylinders. In another embodiment, the average reciprocation period $\Delta t_{AVG}$ is associated with multiple combustion cycles of each of the cylinders. Using a closed loop control based on the reciprocation periods $t_{RECi}$, the control module 30 adjusts the spark timing for each of the cylinders 20 individually to match the average reciprocation period $\Delta t_{AVG}$. The average reciprocation period $\Delta t_{AVG}$ is determined in accordance with the following relationship:

$$\Delta t_{AVG} = (\Delta t_1 + \Delta t_2 + \ldots \Delta t_i)/i$$

Each of the period differences $\Delta t_i$ may represent an average of period differences for a piston over one or more combustion cycles.

The spark timing is adjusted based on the time differences $\Delta t_i$ and the average reciprocation period $\Delta t_{AVG}$. Spark timing adjustment values are determined based on the difference between the period differences $\Delta t_i$ and the average reciprocation period $\Delta t_{AVG}$. The spark timing adjustment values may be stored in a memory 34 and/or used to change the spark timing of the individual cylinders. The spark timing of each cylinder may be adjusted incrementally. For example, the spark timing can be adjusted in one or more 1° increments. Incremental adjustment in spark timing allows the engine idle speed control to determine whether the spark timing is adjusted appropriately (i.e., advanced or retarded and to the correct extent). For example, the engine idle speed control may adjust the spark timing, wait until the engine is running in a steady-state mode after the adjustment, reevaluate updated piston reciprocation periods, and subsequently again adjust the spark timing when appropriate.

The steady-state mode of an engine may refer to when the engine is idling at an approximately constant speed for a predetermined period of time. The steady-state mode of the engine may in addition to or alternatively refer to when each piston of an engine has a constant operating speed and/or associated reciprocation period for a predetermined period of time.

The engine idle speed control is adaptive in that it learns the spark timing values for each of the cylinders 20 and continually adjusts the spark timing as the conditions of the engine 12 change, such as due to ageing. By adjusting the period per cylinder per combustion cycle to the same value for all cylinders, the torque output fluctuations of the engine 12 are eliminated because all of the cylinders output the same torque at this operating point. Deviations from the selected idle speed may be corrected using the techniques described herein. The techniques provided by the embodiments of the present disclosure minimize and/or eliminate torque fluctuations of an engine.

Figure 2:
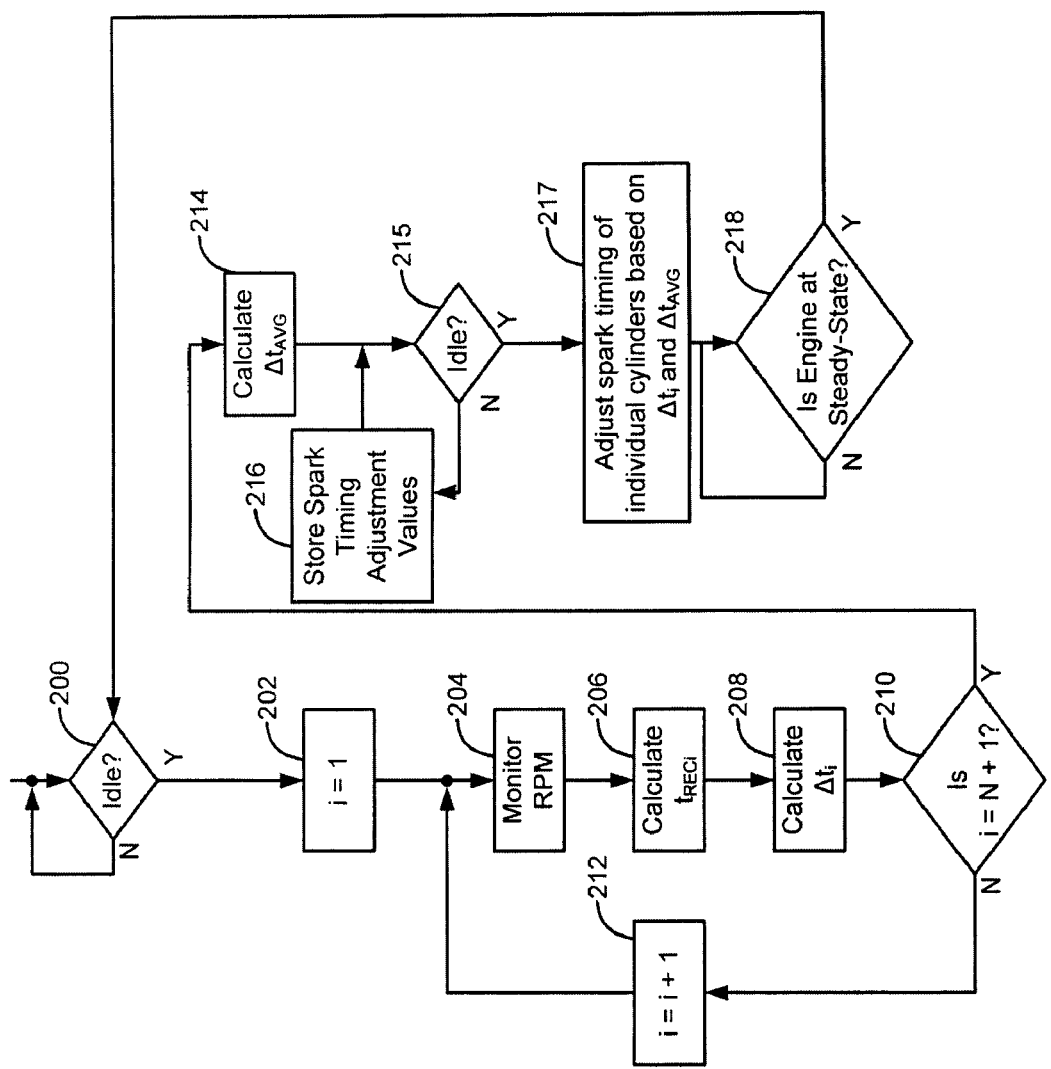
FIG. 2 is a logic flow diagram illustrating a method of controlling idle speed of an engine in accordance with an embodiment of the present disclosure.

Referring now to FIG. 2, a logic flow diagram illustrating a method of controlling idle speed of an engine is shown. The method may include multiple adjustment cycles. In other words, the follow steps may be repeated. In step 200, control determines whether the engine is operating at an idle speed. If the engine is not at idle, control loops back and repeats step 200. When the engine is operating at idle, control proceeds to perform steps 202-218. Steps 202-214 are performed while the engine is operating approximately at the idle speed. In step 202, control sets a counter i equal to 1. The counter i indicates the $i^{th}$ piston and/or cylinder, which may be incremented according to the firing order of the cylinders of the engine, in step 202.

In step 204, control monitors the engine speed based on a generated engine speed signal. In step 206, control calculates the reciprocation periods $t_{RECi}$. Control calculates the period differences $\Delta t_i$ in step 208.

In step 210, control determines whether i is equal to N plus 1, where N is the number of pistons and/or cylinders of the engine. When i is not equal to N+1, control increments i in step 212 and loops back to step 204. When i is equal to N+1, Δt has been determined for all of the cylinders and control continues in step 214. In step 214, control determines average reciprocation period $\Delta t_{AVG}$.

In step 215, control determines whether the engine is operating at an idle speed. When control is operating at an idle speed control proceeds to step 217, otherwise control proceeds to step 216. In step 216, control stores the spark timing adjustment signals.

In step 217, control adjusts the spark timing of the individual cylinders based on the spark timing adjustment signals.

In step 218, control determines whether the engine is in a steady-state condition, as described above. When the engine is in a steady-state condition control may return to step 200.

Figure 3:
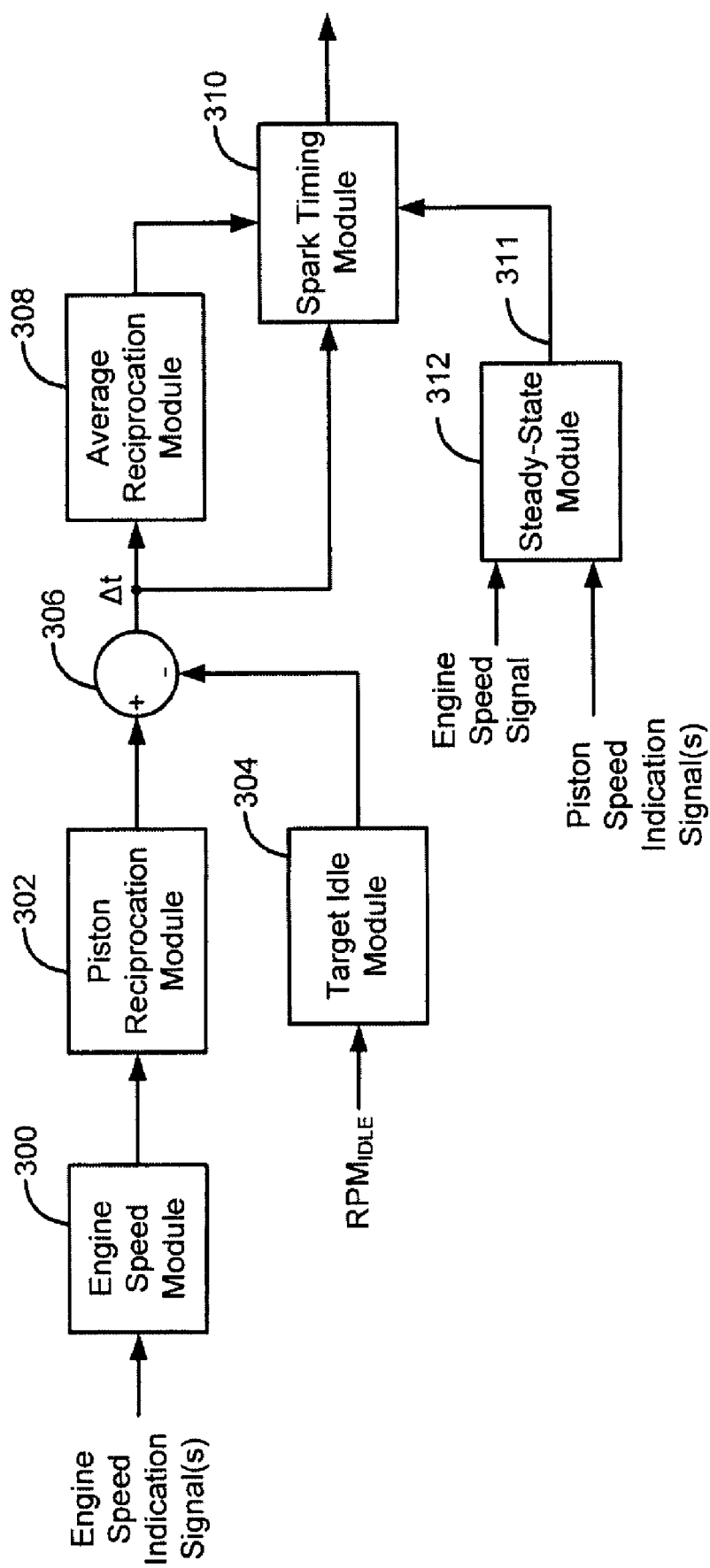
FIG. 3 is a functional block diagram of exemplary modules that execute engine idle control in accordance with an embodiment of the present disclosure.

Referring now to FIG. 3, exemplary modules that execute the engine idle speed control of the present disclosure will be described in detail. The exemplary modules include an RPM monitoring module 300, a piston reciprocation module 302, a target idle module 304, a difference module 306, an average reciprocation module 308 and a spark timing module 310. The engine speed module 300 monitors the speed of an engine, which may be indicated in revolutions per minute (RPM). The engine speed module 300 generates a speed signal based on the crankshaft position sensor output. The piston reciprocation module 302 determines the reciprocation periods $t_{RECi}$ for each of the cylinders of the engine based on the speed of the engine.

The target idle module 304 determines the target idle period $t_{IDLE}$ based on the idle speed $RPM_{IDLE}$. The difference module 306 calculates the period differences $\Delta t_i$ for each of the cylinders based on the respective piston reciprocation period $t_{RECi}$ and the target idle period $t_{IDLE}$. The average reciprocation module 308 determines the average reciprocation period $\Delta t_{AVG}$ based on the period differences $\Delta t_i$ for each of the cylinders.

The spark timing module 310 regulates the spark timing to provide matched cylinder output torque based on differences between the period differences $\Delta t_i$ and the average reciprocation period $\Delta t_{AVG}$. The spark timing module 310 adjusts spark timing based on a steady-state status signal 311 from a steady-state module 312. The steady-state module 312 determines when the engine 12 is operating in a steady-state mode based on an engine speed signal and/or piston speed indication signals, such as signals based on the piston reciprocation periods $t_{RECi}$.

As an example, the spark timing module 310 may compare a first period difference $\Delta t_1$ to an average reciprocation period $\Delta t_{AVG}$ and adjusts spark timing of a first cylinder including updating and matching a first period difference $\Delta t_1$ for a subsequent combustion cycle with the average reciprocation period $\Delta t_{AVG}$. Spark timing of a first spark plug of the first cylinder is advanced or retarded. The spark timing module 310 may then compare a second period difference $\Delta t_2$ to the average reciprocation period $\Delta t_{AVG}$ and adjusts spark timing of a second cylinder including updating and matching a second period difference $\Delta t_2$ for a subsequent combustion cycle with the average reciprocation period $\Delta t_{AVG}$. Spark timing of a second spark plug of the second cylinder is advanced or retarded. The adjustment in spark timing for the second spark plug may be the same or different than the spark timing adjustment for the first spark plug. When adjusting spark timing, the spark timing of one or more of the cylinders of the engine 12 may be unchanged.

Those skilled in the art can now appreciate from the foregoing description that the broad teachings of the present disclosure can be implemented in a variety of forms. Therefore, while the embodiments disclosed herein have been described in connection with particular examples thereof, the true scope of the embodiments should not be so limited since other modifications will become apparent to the skilled practitioner upon a study of the drawings, the specification and the following claims.

What is claimed is:

1. An idle speed control system for an engine comprising:
    an engine speed module that generates an engine speed signal;
    a piston reciprocation module that determines reciprocation periods of each piston of cylinders of the engine based on said engine speed signal;
    a difference module that determines a period difference between each of said reciprocation periods and an idle period associated with a target idle speed; and
    a spark timing module that regulates an idle speed of the engine including adjustment of spark timing for each of said cylinders individually based on said period differences.

2. The idle speed control system of claim 1 further comprising an average reciprocation module that calculates an average reciprocation period based on said period differences,
    wherein said spark timing module adjusts spark timing of each of said cylinders based on said average reciprocation period.

3. The idle speed control system of claim 2 wherein said spark timing module compares a first period difference to said average reciprocation period and adjusts spark timing of a first cylinder including updating and matching another first period difference with said average reciprocation period, and
    wherein said spark timing module compares a second period difference to said average reciprocation period and adjusts spark timing of a second cylinder including updating and matching another second period difference with said average reciprocation period.

4. The engine idle speed control system of claim 1 wherein said spark timing module incrementally adjusts said spark timing for each of said cylinders.

5. The engine idle speed control system of claim 4 wherein said spark timing module incrementally adjusts said spark timing by a single degree during each adjustment cycle.

6. The engine idle speed control system of claim 1 wherein said spark timing module advances or retards said spark timing for each of said cylinders when adjusting said spark timing.

7. The engine idle speed control system of claim 1 wherein said spark timing module adjusts said spark timing for each of said cylinders differently.

8. The engine idle speed control system of claim 1 further comprising a steady-state module that generates a steady-state signal that is indicative of state of the engine,
wherein said spark timing module adjusts said spark timing based on said steady-state signal.

9. The engine idle speed control system of claim 1 wherein said spark timing module adjusts said spark timing of each of said cylinders when the engine is operating at an idle speed.

10. The engine idle speed control system of claim 9 wherein said spark timing module prevents adjustment in spark timing when the engine is operating at speeds other than said idle speed.

11. A method of regulating an idle speed of an engine comprising:
generating an engine speed signal;
determining reciprocation periods of each piston of cylinders of the engine based on said engine speed signal;
determining a period difference between each of said reciprocation periods and an idle period associated with a target idle speed; and
regulating the idle speed including adjusting spark timing for each of said cylinders individually based on said period differences.

12. The method of claim 11 wherein regulating the idle speed comprises:
calculating an average reciprocation period based on said period differences; and
adjusting spark timing of each of said cylinders based on said average reciprocation period.

13. The method of claim 11 wherein regulating the idle speed comprises adjusting said spark timing for each of said cylinders differently.

14. The method of claim 11 further comprising:
storing said adjustment values for said spark timing; and
inducing ignition of the engine based on said adjusted values when the engine returns to operating at said idle speed.

15. A method of generating a common torque from each cylinder of an engine comprising:
generating an engine speed signal;
determining reciprocation periods of each piston of cylinders of the engine based on the engine speed signal;
determining a period difference between each of said reciprocation periods and an idle period associated with a target idle speed; and
matching said torque outputs of each of said cylinders relative to each other based on said period differences while the engine is operating at an idle speed.

16. The method of claim 15 wherein matching said torque output comprises adjusting spark timing for each of said cylinders individually based on said period differences.

17. The method of claim 15 wherein matching said torque output comprises:
calculating an average reciprocation period based on said period differences; and
adjusting spark timing of each of said cylinders based on said average reciprocation period.

18. The method of claim 17 comprising:
comparing a first period difference to said average reciprocation period and adjusting spark timing of a first cylinder including updating and matching another first period difference with said average reciprocation period; and
comparing a second period difference to said average reciprocation period and adjusting spark timing of a second cylinder including updating and matching another second period difference with said average reciprocation period.

19. The method of claim 15 wherein matching said torque output comprises incrementally adjusts said spark timing for each of said cylinders.

20. The method of claim 15 wherein matching said torque output comprises adjusting said spark timing for each of said cylinders differently.

* * * * *